A. B. COOK.
Shaft-Coupling.

No. 165,546.

Patented July 13, 1875.

WITNESSES

INVENTOR
Asa Brown Cook
Chipman Hosmer & Co
ATTORNEYS

3 Sheets--Sheet 2.

A. B. COOK.
Shaft-Coupling.

No. 165,546.

Patented July 13, 1875.

WITNESSES
Eugene W. Johnson
Geo. E. Upham

INVENTOR
Asa Brown Cook,
Chipman Hosmer & Co,
ATTORNEYS

A. B. COOK.
Shaft-Coupling.

No. 165,546.

3 Sheets--Sheet 3.

Patented July 13, 1875.

WITNESSES
Eugene W. Johnson
Geo. E. Upham

INVENTOR
Asa Brown Cook,
Chipman Hosmer & Co,
ATTORNEYS

UNITED STATES PATENT OFFICE.

ASA BROWN COOK, OF ERIE, PENNSYLVANIA.

IMPROVEMENT IN SHAFT-COUPLINGS.

Specification forming part of Letters Patent No. 165,546, dated July 13, 1875; application filed March 27, 1875.

*To all whom it may concern:*

Be it known that I, ASA BROWN COOK, of Erie, in the county of Erie and State of Pennsylvania, have invented a new and valuable Improvement in Shaft-Couplings; and I do hereby declare that the following is a full, clear, and exact description of the construction and operation of the same, reference being had to the annexed drawings, making a part of this specification, and to the letters and figures of reference marked thereon.

Figure 1:
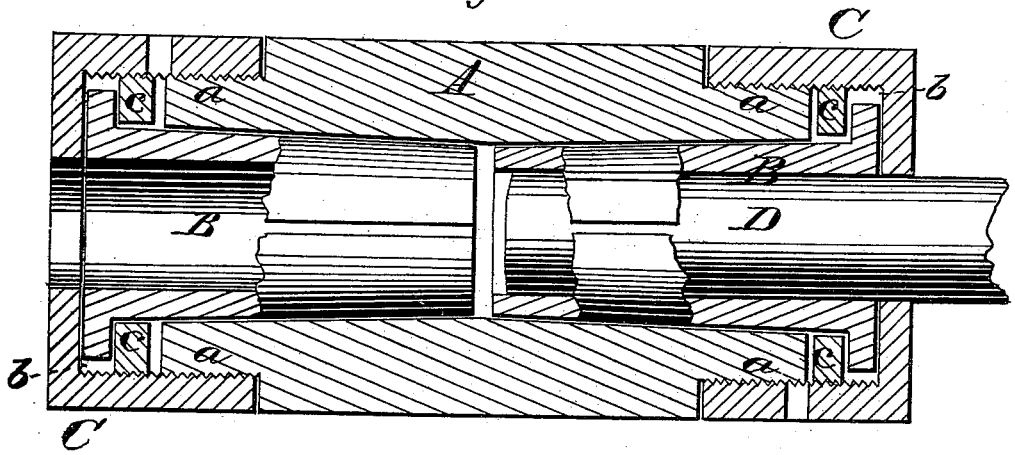
Figure 2:
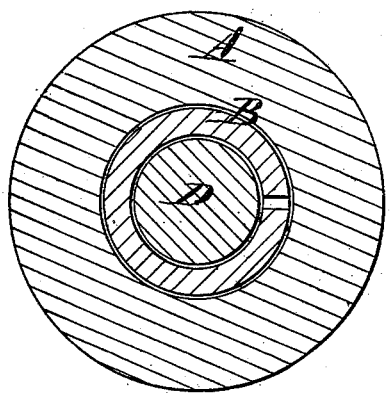
Figure 3:
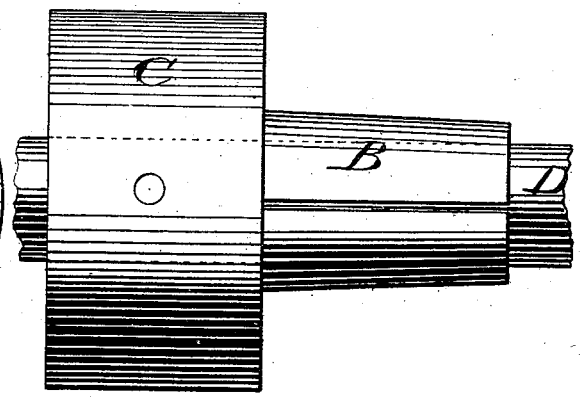
Figure 4:
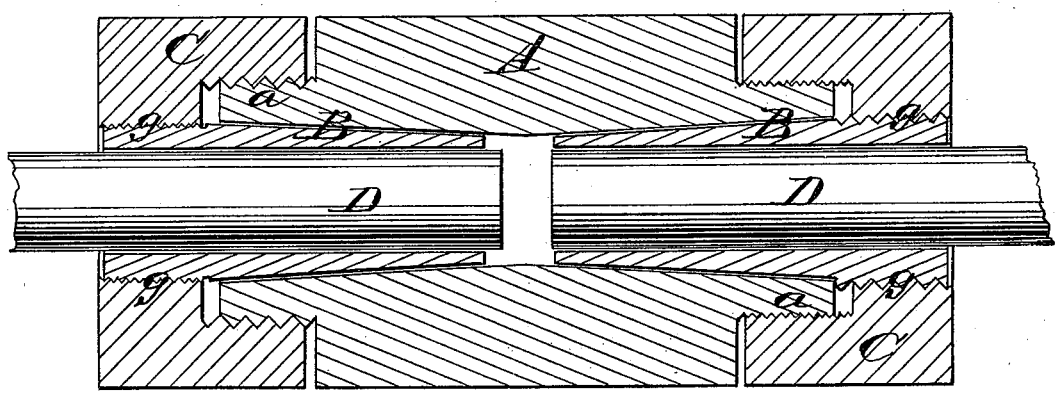

Figure 1 of the drawings is a representation of a longitudinal vertical section of my shaft-coupling. Fig. 2 is a transverse sectional view of the same, and Fig. 3 is a detail view. Fig. 4 is a sectional detail view, and Figs. 5, 6, 7, 8, and 9 are detail views.

This invention has relation to means for securing hubs or rings to shafts or axles, for coupling one shaft to another, for securing pulleys on shafts, and for other purposes; and the nature of my invention consists in combining with a hub having a tapered bore, a split sleeve, on which is applied a nut which is allowed to turn freely around the sleeve, whereby a circular motion may be imparted to the nut and an endwise or traversing motion given to the sleeve, not only in tightening the hub on its shaft, but also in loosening the parts, as will be hereinafter more fully explained.

Figure 5:
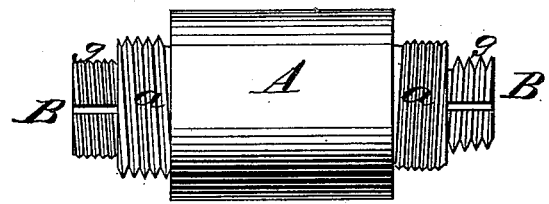
Figure 6:
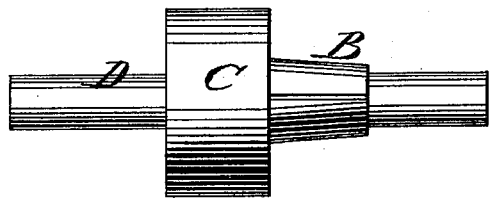
Figure 7:
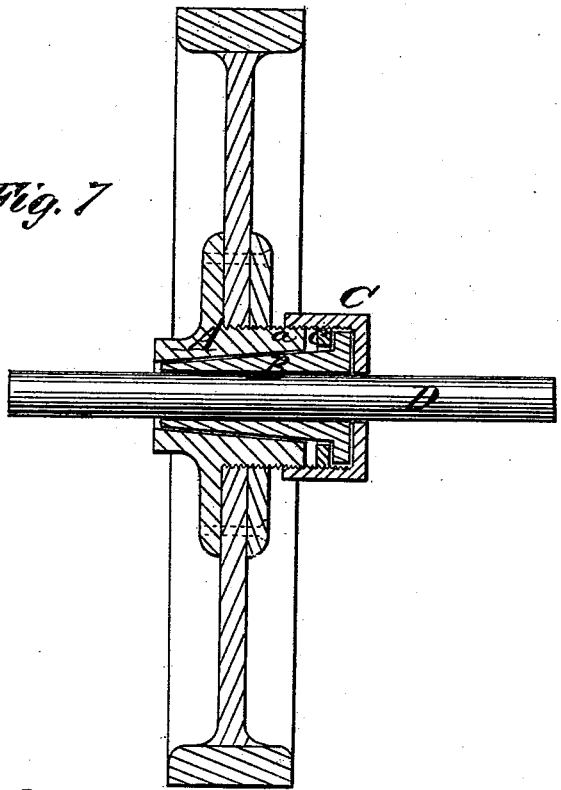
Figure 8:
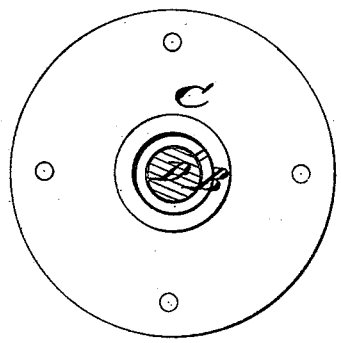
Figure 9:
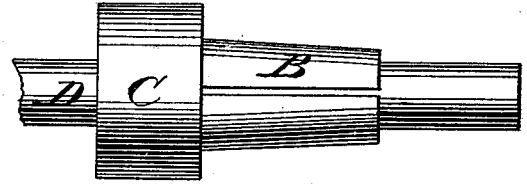

In the annexed drawings, Figs. 1 and 2, A designates a hub or ring of any suitable diameter and length, which is constructed with screw-threaded ends *a a*, and with a bore which tapers decreasingly from said screw-threaded end or ends. This hub is preferably made of one piece. B B designate sleeves which are tapered externally to be received into the tapered bore of the hub A. The largest ends of the sleeves B B are externally flanged, as indicated in Fig. 1, which flanges are loosely received in annular recesses *b b* formed in screw-threaded nuts C C. The drawing, Fig. 1, indicates screw-threaded rings *c*, for uniting the nuts to their sleeves. The nuts C C are screw-threaded for the purpose of screwing them on the ends of the hub, during which operation the sleeves will wedge themselves tightly in their places and firmly hold the hub on the ends of the shaft-sections D D. By turning the nuts in opposite directions—that is to say, unscrewing them from the hub A, they will retract the sleeves and thus loosen the parts. I thus have the same facility of relieving the friction as in setting up the sleeves. Instead of flanging the split sleeves and uniting them to their nuts, as above described, I may form screw-threads *g g* on their largest ends and screw them into the ends of the nuts, as shown in Figs. 4 and 5. Figs. 7, 8, and 9 show a hub, A, which is especially designed for belt-pulleys, but which may be used for other purposes. This hub has a single tapered bore, and consequently a single sleeve and nut will be used.

What I claim as new, and desire to secure by Letters Patent, is—

The screw-threaded nut C, having the interior ring or flange *c*, in combination with a screw-threaded hub, A, and split taper-sleeve B, operating substantially as described.

In testimony that I claim the above I have hereunto subscribed my name in the presence of two witnesses.

ASA BROWN COOK.

Witnesses:
 JOHN B. CORLISS,
 GEORGE E. UPHAM.